United States Patent
Ling

(10) Patent No.: US 7,388,359 B1
(45) Date of Patent: Jun. 17, 2008

(54) CONSTANT CURRENT OUTPUT USING TRANSCONDUCTANCE AMPLIFIER

(75) Inventor: Lawrence Hok-Sun Ling, Fanling (HK)

(73) Assignee: National Semiconductor Corporation, Santa Clara, CA (US)

( * ) Notice: Subject to any disclaimer, the term of this patent is extended or adjusted under 35 U.S.C. 154(b) by 126 days.

(21) Appl. No.: 11/357,353

(22) Filed: Feb. 17, 2006

(51) Int. Cl.
*G05F 1/575* (2006.01)
*G05F 1/62* (2006.01)

(52) U.S. Cl. .................... 323/284; 323/288

(58) Field of Classification Search ............... 323/283, 323/284, 282, 222–224, 265, 288, 351
See application file for complete search history.

(56) References Cited

U.S. PATENT DOCUMENTS 6,871,289 B2 * 3/2005 Pullen et al. ............... 713/300
7,058,373 B2 * 6/2006 Grigore ...................... 323/266
7,132,820 B2 * 11/2006 Walters et al. ............... 323/282

OTHER PUBLICATIONS

T. Suntio et al., "Dynamic Effects of Inductor Current Ripple in Average Current Mode Control", 2001 IEEE, pp. 1259-1264.
Zaohong Yang et al., "DC-To-DC Buck Converters with Novel Current Mode Control", 1999 IEEE, pp. 1158-1164.

* cited by examiner

*Primary Examiner*—Gary L Laxton

(57) ABSTRACT

An apparatus in an electronic device such as a buck converter circuit receives as a first input a voltage signal VSNS from the electronic device that represents a current through the electronic device, and receives as a second input a direct current reference voltage signal from a reference voltage source VREF. The apparatus regulates a direct current output IOUT of the electronic device with respect to the reference voltage source VREF by applying a pulse level transformation to the voltage signal VSNS using an operational transconductance amplifier.

20 Claims, 12 Drawing Sheets

As DC(VRP) > DC(VSNS),
OAOUT Increases,
Duty Cycle Increases,
Inductor Current Increases,
Output Current Increases As DC(VSNS) > DC(VRP),
OAOUT Decreases,
Duty Cycle Decreases,
Inductor Current Decreases,
Output Current Decreases

US 7,388,359 B1

CONSTANT CURRENT OUTPUT USING TRANSCONDUCTANCE AMPLIFIER

TECHNICAL FIELD OF THE INVENTION

The present invention is generally directed to integrated circuit devices and, in particular, to a system and method for providing high efficiency precise constant current output in an electronic device.

BACKGROUND OF THE INVENTION

To better understand the advance in the art that the present invention provides a prior art floating buck converter circuit 100 will first be described. As shown in FIG. 1, prior art floating buck converter circuit 100 comprises the following elements: diode 110, capacitor 120, load 130, inductor 140, transistor 150 (here shown as a field effect transistor (FET) designated "MAIN FET M0"), resistor RSNS, pulse width modulation (PWM) control unit 160 and gate driver 170. The diode 110, capacitor 120 and the load 130 are coupled in parallel with a first end of each element coupled to the input voltage VIN. The load 130 shown in FIG. 1 comprises a plurality of serially connected light emitting diodes (LEDs). The output current through the load 130 is designated IOUT.

A first end of inductor 140 is coupled to the second end of diode 110 and to the drain of transistor 150. A second end of inductor 140 is coupled to the second end of load 130 and the second end of capacitor 120. The current through inductor 140 is referred to as the inductor current and is designated with the letters IL.

The source of transistor 150 is coupled to a first end of resistor RSNS. The second end of resistor RSNS is coupled to ground. The current through the transistor 150 is referred to as the transistor current and is designated by the letters IFET. A first end of a voltage signal line 180 is coupled to node between transistor 150 and resistor RSNS. The value of voltage at the node is designated with the letters VSNS. The second end of the voltage-signal line 180 is provided to an input of the pulse width modulation (PWM) control unit 160. An output of the pulse width modulation (PWM) control unit 160 is provided to gate driver 170. The output of gate driver 170 is connected to the gate of transistor 150. Control signals from the pulse width modulation (PWM) control unit 160 are provided through gate driver 170 to the gate of transistor 150 to control the transistor current and the output current IOUT. The pulse width modulation (PWM) control unit 160 monitors the value of the voltage signal VSNS on voltage signal line 180 and adjusts the value of the control signals to gate driver 170 based on the average value of the VSNS voltage.

FIG. 2 illustrates a schematic circuit diagram 200 of the prior art floating buck converter circuit 100 shown in FIG. 1 showing the pulse width modulation (PWM) control unit 160 in more detail. The second end of the voltage signal line 180 is provided to an input of a leading edge blanking unit 210. The operation of the leading edge blanking unit 210 removes any voltage "spike" that may be present at the leading edge of the VSNS voltage signal.

The output of the leading edge blanking unit 210 is provided to a non-inverting input of a comparator unit 220. A reference voltage VREF is provided to the inverting input of comparator unit 220. The output of comparator unit 220 is provided to the pulse width modulation (PWM) control logic circuit 230. As shown in FIG. 2, the PWM control logic circuit 230 comprises a first edge pulse generator unit 240, a second edge pulse generator unit 250, a first NOR gate 260, a second NOR gate 270, and a third NOR gate 280.

As shown in FIG. 2, an input line 290 provides a pulse signal to the first edge pulse generator unit 240 and to the second edge pulse generator 250. The first edge pulse generator unit 240 generates a first control signal pulse and provides the first control signal pulse to an A1 input of the third NOR gate 280. The second edge pulse generator unit 250 generates a second control signal pulse and provides the second control signal pulse to an A1 input of the first NOR gate 260.

The comparator 220 generates a third control signal by comparing the reference voltage VREF to the VSNS voltage signal on voltage signal line 180. The comparator 220 provides the third control signal to an A2 input of the second NOR gate 270. The output of first NOR gate 260 and the output of second NOR gate 270 are cross-coupled. That is, the output of the first NOR gate 260 is provided to the A1 input of the second NOR gate 270. The output of the second NOR gate 270 is provided to the A2 input of the first NOR gate 260. The output of the first NOR gate 260 is also provided to the A2 input of the third NOR gate 280. The output of the third NOR gate 280 is provided to the gate driver 170.

The general principles of operation of the prior art floating buck converter circuit 100 shown in FIG. 1 (and the circuit 200 shown in FIG. 2) are well known in the art. Prior art floating buck converter circuits operate by sensing the sloped rise portion of the inductor ripple current. However, the choice of a particular value for inductor 140 will alter the average output current.

Consider, for example, the two waveforms of inductor current 300 shown in FIG. 3. The first waveform 310 for a first inductor illustrates a first inductor ripple current in a prior art floating buck converter circuit. The second waveform 320 for a second inductor illustrates a second inductor ripple current in the same prior art floating buck converter circuit.

The value of peak current is the same for both the first waveform 310 and the second waveform 320. However, the average current for the first waveform 310 ("Average Current 1") is greater than the average current for the second waveform 320 ("Average Current 2"). The prior art method of sensing the peak value of current to regulate the peak inductor current does not determine a true average output current value. This leads to less precision in the average output current regulation. Therefore it would be desirable to have an apparatus and method that could determine a true value of the average output current and utilize the true value to provide a true average output current regulation.

FIG. 4 illustrates generic waveforms of a prior art floating buck converter circuit. FIG. 4($a$) shows the inductor current IL as a function of time. The inductor current ripple is designated with the letters Irip. The average value of the inductor current IL is equal to the direct current (DC) output current IOUT. FIG. 4($b$) shows the field effect transistor current IFET as a function of time. The mid-level value of the IFET current during the sloped rise of the IFET current is equal to the direct current (DC) output current IOUT. As shown in FIG. 4($b$), the increase in the IFET current during its sloped rise is equal to the inductor current ripple Irip. When the IFET current has increased by a value of one half Irip ("Irip/2") from the beginning of the sloped increase in current then the IFET current has reached a value of the direct current (DC) output current IOUT.

FIG. 4($c$) shows the value of the VSNS voltage signal as a function of time. The mid-level value of the VSNS voltage signal during the sloped rise of the VSNS voltage is equal to the product of the direct current (DC) output current IOUT and the resistance RSNS. Comparing FIG. 4(b) and FIG. 4(c) leads to the relationship shown in FIG. 4(d). The mid-level of the sloped rise of the VSNS voltage (that originated from the inductor current ripple Irip) is equal to the product of the direct current (DC) output current IOUT and the resistance RSNS.

As shown in FIG. 4(d), the increase in the VSNS voltage during its sloped rise is equal to the product of the inductor current ripple Irip and the resistance RSNS. When the VSNS voltage has increased by a value of one half Irip ("Irip/2") times the resistance RSNS from the beginning of the sloped increase in voltage then the VSNS voltage has reached a value of the direct current (DC) output current IOUT times the resistance RSNS.

There is a need in the art for a system and method that is capable of precisely regulating the direct current (DC) output current of a floating buck converter circuit. There is also a need in the art for a system and method that is capable of determining a true value of the average output current and utilizing the true value to provide a true average output current regulation in a floating buck converter circuit.

One prior art approach to controlling a floating buck converter circuit is set forth in a paper entitled Dynamic Effects of Inductor Current Ripple in Average Current Mode Control by T. Suntio, J. Lempinen et al. published in the 32$^{nd}$ Annual IEEE Power Electronics Specialists Conference, 17-21 Jun. 2001, Volume 3, pp. 1259-1264. Another prior art approach to controlling a floating buck converter circuit is set forth in a paper entitled DC-to-DC Buck Converters with Novel Current Mode Control by Z. Yang and P. C. Sen published in the 30$^{th}$ Annual IEEE Power Electronics Specialists Conference, 27 Jun.-1 Jul. 1999, Volume 2, pp. 1158-1164.

The assignee of the present patent application also has a related patent application entitled Versatile System for High-Power Switching Controller in Low-Power Semiconductor Technology filed on Nov. 2, 2005 with patent application Ser. No. 11/265,783.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 5 through 17, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged electronic device.

In particular, exemplary embodiments of the present invention will be described in a floating buck converter circuit. It is understood that the present invention is not limited to use in a floating buck converter circuit and that the principles of the present invention can also be employed in other types of devices.

Figure 4:
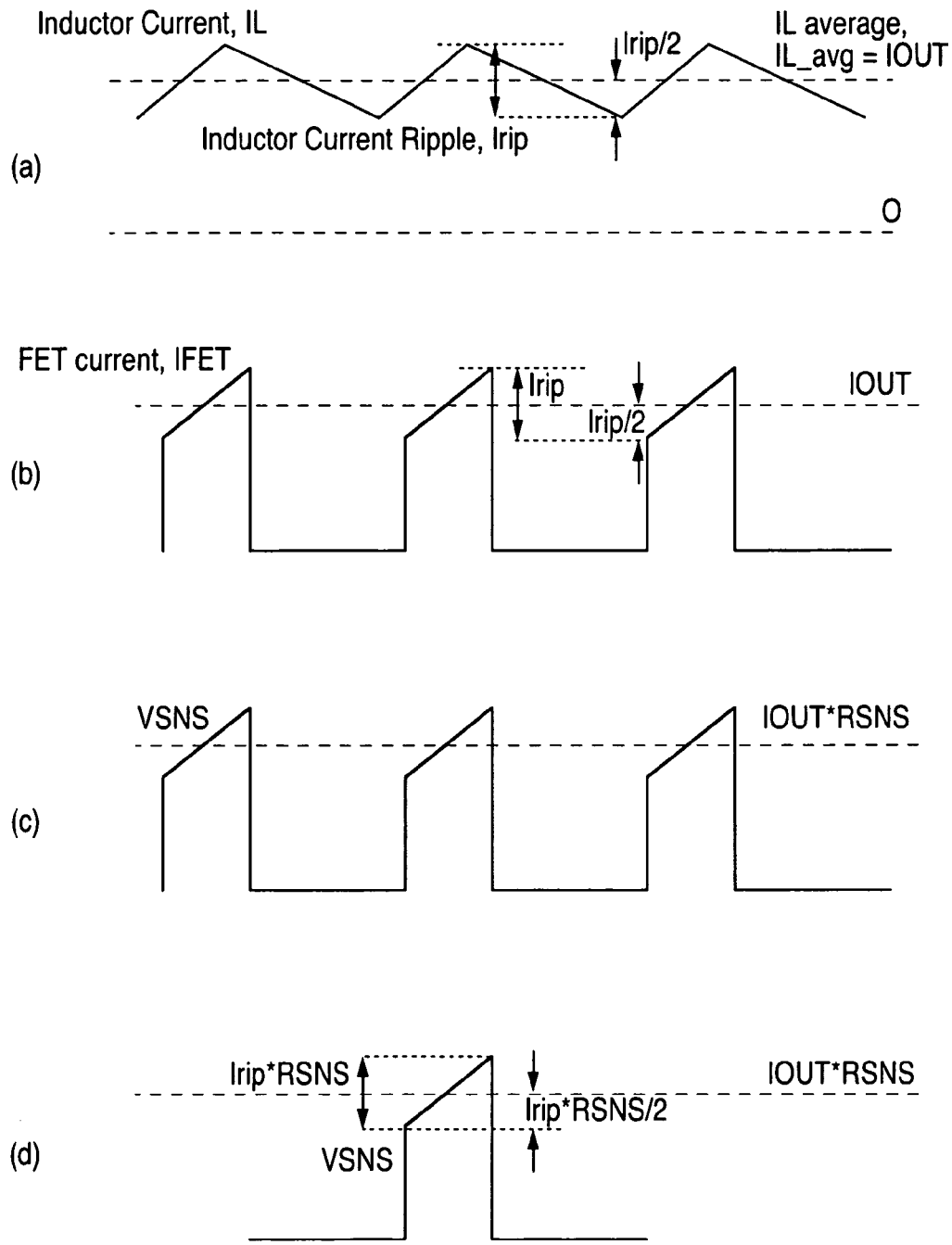
FIG. 4 illustrates waveforms showing an inductor current, a field effect transistor current, and a VSNS voltage signal in a prior art floating buck converter circuit.
Figure 5:
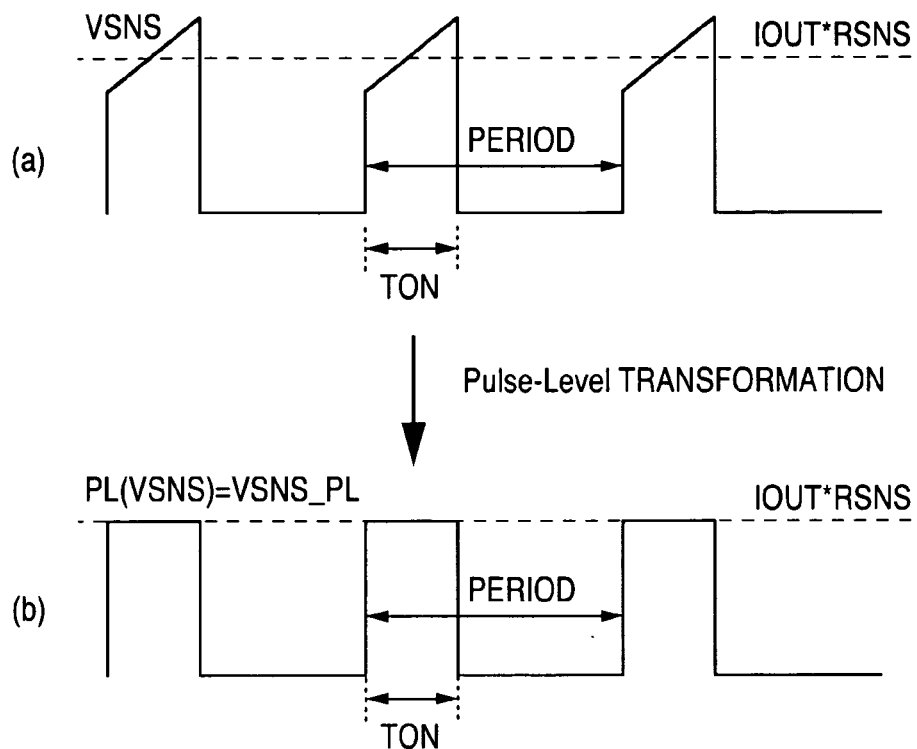
FIG. 5 illustrates a schematic diagram of the result of applying a pulse level transformation of the present invention to a VSNS voltage signal in a floating buck converter circuit.

The VSNS slope shown in FIG. 4(d) suggests that if one could regulate the mid-level of the VSNS slope of the VSNS voltage signal then one could regulate the direct current (DC) output current. The present invention comprises a system and method for applying a Pulse Level Transformation to the VSNS voltage signal in a floating buck converter circuit. FIG. 5 illustrates a schematic diagram of the result of applying the Pulse Level Transformation of the present invention to a VSNS voltage signal.

FIG. 5(a) illustrates a periodic VSNS voltage signal in which the mid-level of the VSNS slope is equal to the product of the output current IOUT and the resistance RSNS. The period of the VSNS voltage signal shown in FIG. 5(a) is measured between each successive leading edge of a VSNS pulse. The duration of the pulse is designated with the letters "TON".

FIG. 5(b) illustrates the result of applying the Pulse Level Transformation to the VSNS voltage signal shown in FIG. 5(a). How the Pulse Level Transformation is accomplished will be described more fully below. The resulting waveform in FIG. 5(b) comprises a periodic square waveform that has the same period (designated PERIOD), the same pulse duration (designated TON) and the same direct current (DC) value as the VSNS voltage signal shown in FIG. 5(a). However, the first portion of each VSNS pulse (beneath the mid-level line) has been increased to raise the first portion of each VSNS pulse to the mid-level line. The second portion of each VSNS pulse (above the mid-level line) has been decreased to lower the second portion of each VSNS pulse to the mid-level line.

The result is the periodic square waveform that is shown in FIG. 5(b). The letters PL refer to the Pulse Level (PL) Transformation. The Pulse Level Transformation of the VSNS voltage signal is represented by the expression PL(VSNS). An alternate expression is VSNS_PL. As shown in FIG. 5(b), the upper rail of Pulse Level Transformation of the VSNS voltage signal (VSNS_PL) is equal to the mid-level of the VSNS slope of the VSNS voltage signal (i.e., the product of the output current IOUT and the resistance RSNS). The direct current (DC) (average) value is the same after the Pulse Level Transformation has been applied.

A Pulse Level Transformation is a many-to-one mapping. For a specific set of VSNS voltage signals (each with the same period ("PERIOD") and the same pulse duration ("TON") and the same mid-level of the VSNS slope of the VSNS voltage signal), there exists only one Pulse Level Transformation waveform PL(VSNS) that results from applying the Pulse Level Transformation. This unique Pulse Level Transformation waveform PL(VSNS) is independent of (1) the value of the inductance L of the inductor 140, and (2) the value of the current ripple Irip, and (3) the value of the peak current Ipeak, and (4) the value of the input voltage VIN.

Figure 6:
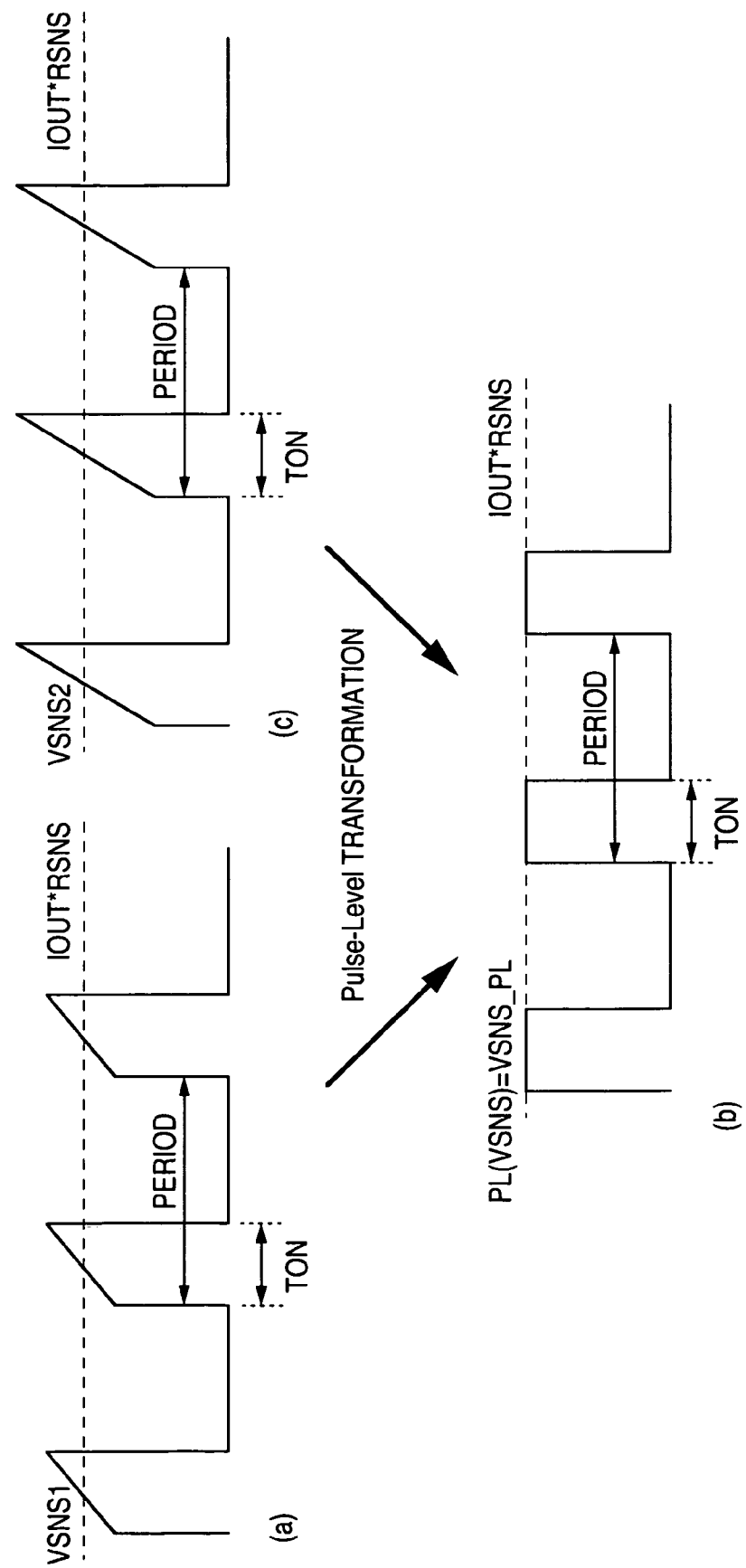
FIG. 6 illustrates a schematic diagram of the result of applying a pulse level transformation of the present invention to two VSNS voltage signals each of which has a different slope.

This feature is illustrated in FIG. 6. FIG. 6(b) illustrates a PL(VSNS) waveform that results from applying the Pulse Level Transformation to the VSNS1 waveform shown in FIG. 6(a). FIG. 6(b) also illustrates that the same PL(VSNS) waveform results when the Pulse Level Transformation is applied to the VSNS2 waveform that is shown in FIG. 6(c). The VSNS1 waveform shown in FIG. 6(a) and the VSNS2 waveform shown in FIG. 6(c) each have the same period ("PERIOD") and the same pulse duration ("TON") and the same mid-level of the VSNS slope of the VSNS voltage signal ("IOUT times RSNS"). But the VSNS1 waveform shown in FIG. 6(a) and the VSNS2 waveform shown in FIG. 6(c) each have a different VSNS slope for their respective VSNS pulses.

The many-to-one feature of the Pulse Level Transformation means that it is possible to control the upper rail value of the PL(VSNS) waveform to obtain a desired output current IOUT regardless of the value of the input voltage VIN and the value of inductance L of the inductor 140.

Figure 7:
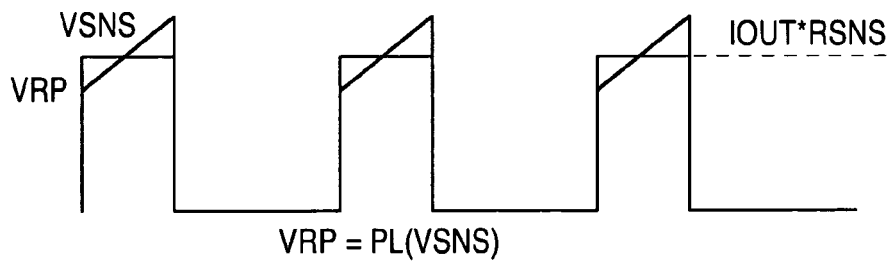
FIG. 7 illustrates a schematic diagram of the result of applying a pulse level transformation of the present invention to a VSNS voltage signal that comprises a periodic trapezoid pulse chain to obtain a VRP voltage signal that comprises a periodic square pulse chain.

The VRP designation is illustrated in the waveform shown in FIG. 7. The VSNS voltage signal comprises a periodic trapezoid pulse chain. The VRP voltage signal comprises a periodic square pulse chain.

If the VSNS waveform and the VRP waveform each have the same frequency (related to period), the same duty cycle (related to pulse duration), and the same direct current (DC) (average) value, then the VRP voltage signal must be the Pulse Level Transformation of the VSNS voltage signal. That is, VRP=PL(VSNS). This means that the mid-level of the VSNS slope equals the upper rail of the VRP waveform.

Figure 2:
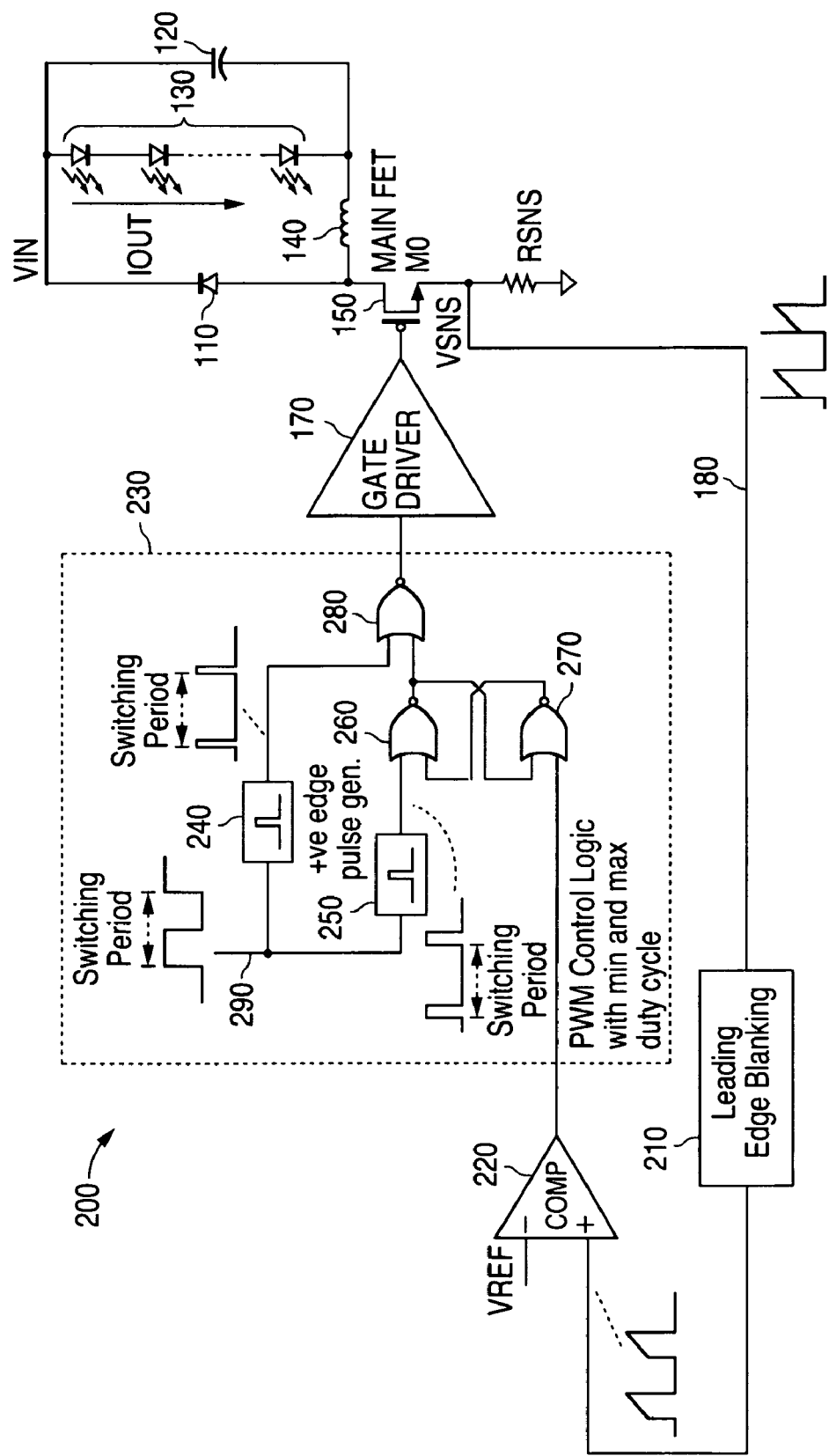
FIG. 2 illustrates a schematic circuit diagram of the prior art floating buck converter circuit shown in FIG. 1 showing the pulse width modulation (PWM) control unit in more detail.
Figure 8:
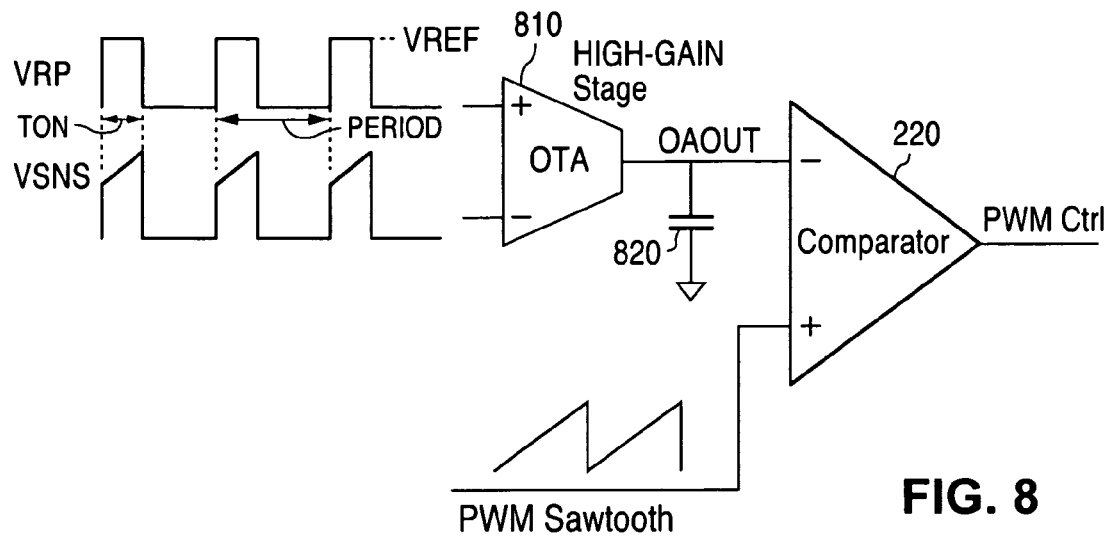
FIG. 8 illustrates a schematic diagram of an apparatus of the present invention for applying pulse level transformation to VSNS voltage signals in a floating buck converter circuit.

FIG. 8 illustrates a schematic diagram of an apparatus of the present invention for implicitly applying Pulse Level Transformation to VSNS voltage signals in a floating buck converter circuit. The comparator 220 that is shown in FIG. 8 is the same comparator 220 that is shown in FIG. 2. The PWM sawtooth signal on the non-inverting input of comparator 220 is a PWM sawtooth reference voltage. The output of comparator 220 is provided to the pulse width modulation (PWM) control logic circuit 230 shown in FIG. 2.

As shown in FIG. 8, the apparatus of the present invention comprises an operational transconductance amplifier (OTA) 810. The OTA 810 comprises a HIGH GAIN stage for the amplification of the voltage signals. The output of the OTA 810 is designated with the letters OAOUT. The OAOUT signal is provided to the inverting input of the comparator 220. A first end of a filter capacitor 820 is coupled to a node between the output of the OTA 810 and the inverting input of comparator 220. A second end of the filter capacitor 820 is connected to ground.

As also shown in FIG. 8, the VRP waveform is provided to the non-inverting input of the OTA 810. The VSNS waveform is provided to the inverting input of the OTA 810. The closed loop operation of the circuit illustrated in FIG. 8 implicitly performs the Pulse Level Transformation process in a floating buck converter circuit. As shown in FIG. 8, the VRP square waveform is synchronized with the VSNS trapezoidal waveform. This synchronization means that the VRP waveform and the VSNS waveform have the same period and the same pulse duration TON (i.e., the same duty cycle). The VRP waveform has its upper rail equal to a well-defined reference voltage VREF.

The high loop gain that is provided by the OTA 810 equalizes the direct current (DC) value of the VRP waveform and that of the VSNS waveform. Then the VSNS waveform and the VRP waveform have the same frequency (related to period), and the same duty cycle (related to pulse duration), and the same direct current (DC) value. Thus the VRP waveform becomes the Pulse Level Transformation of the VSNS waveform, which implies that the mid-level of the VSNS slope (i.e., IOUT times RSNS) equals the upper rail of the VRP waveform (i.e., VREF). For this reason, the direct current (DC) value IOUT can be regulated with respect to the value of VREF alone.

Figure 9:
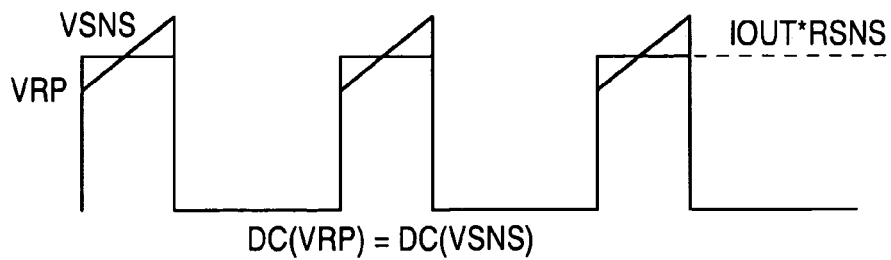
FIG. 9 illustrates a schematic diagram showing a VSNS voltage signal waveform and a VRP voltage signal waveform in regulation.

FIG. 9 illustrates a schematic diagram showing the VSNS waveform and the VRP waveform when the two waveforms are in regulation. The mid-level of the VSNS slope (i.e., IOUT times RSNS) is equal to the upper rail of the VRP waveform. When the VRP waveform and the VSNS waveform are in regulation, then the direct current (DC) value of the VRP waveform (designated DC(VRP)) is equal to the direct current (DC) value of the VSNS waveform (designated DC(VSNS)).

Figure 10:
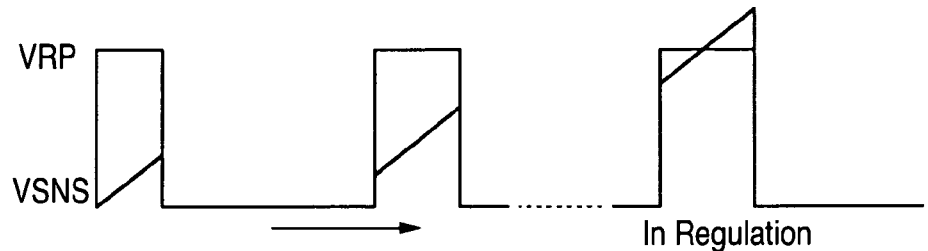
FIG. 10 illustrates a schematic diagram showing how a closed loop operation of the present invention brings a VSNS voltage signal waveform and a VRP voltage signal waveform into regulation when the output current is initially too low.

FIG. 10 illustrates a schematic diagram showing how a closed loop operation of the present invention brings a VSNS waveform and a VRP waveform into regulation when the output current is initially too low. As shown in the earliest (i.e., leftmost) pulse in FIG. 10, the direct current (DC) value of the VRP waveform is initially greater than the direct current (DC) value of the VSNS waveform. The closed loop operation of the present invention increases the output OAOUT of the OTA 810. This increases the duty cycle of the two waveforms, and increases the inductor current IL, and increases the output current IOUT until the direct current (DC) value of the VRP waveform is equal to the direct current (DC) value of the VSNS waveform and the VRP waveform and the VSNS waveform are in regulation.

Figure 11:
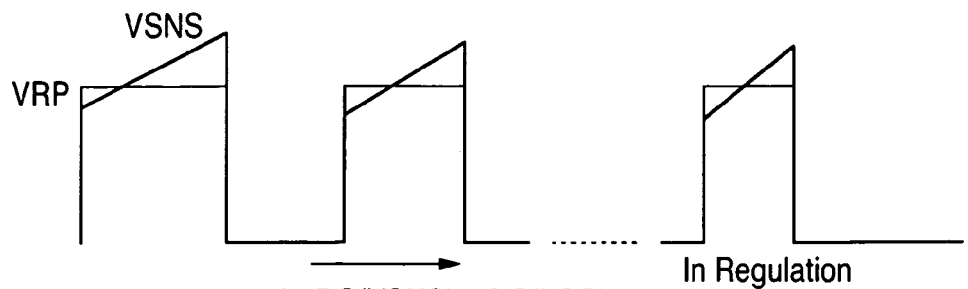
FIG. 11 illustrates a schematic diagram showing how a closed loop operation of the present invention brings a VSNS voltage signal waveform and a VRP voltage signal waveform into regulation when the output current is initially too high.

FIG. 11 illustrates a schematic diagram showing how a closed loop operation of the present invention brings a VSNS waveform and a VRP waveform into regulation when the output current is initially too high. As shown in the earliest (i.e., leftmost) pulse in FIG. 11, the direct current (DC) value of the VRP waveform is initially less than the direct current (DC) value of the VSNS waveform. The closed loop operation of the present invention decreases the output OAOUT of the OTA 810. This decreases the duty cycle of the two waveforms, and decreases the inductor current IL, and decreases the output current IOUT until the direct current (DC) value of the VRP waveform is equal to the direct current (DC) value of the VSNS waveform and the VRP waveform and the VSNS waveform are in regulation.

Figure 1:
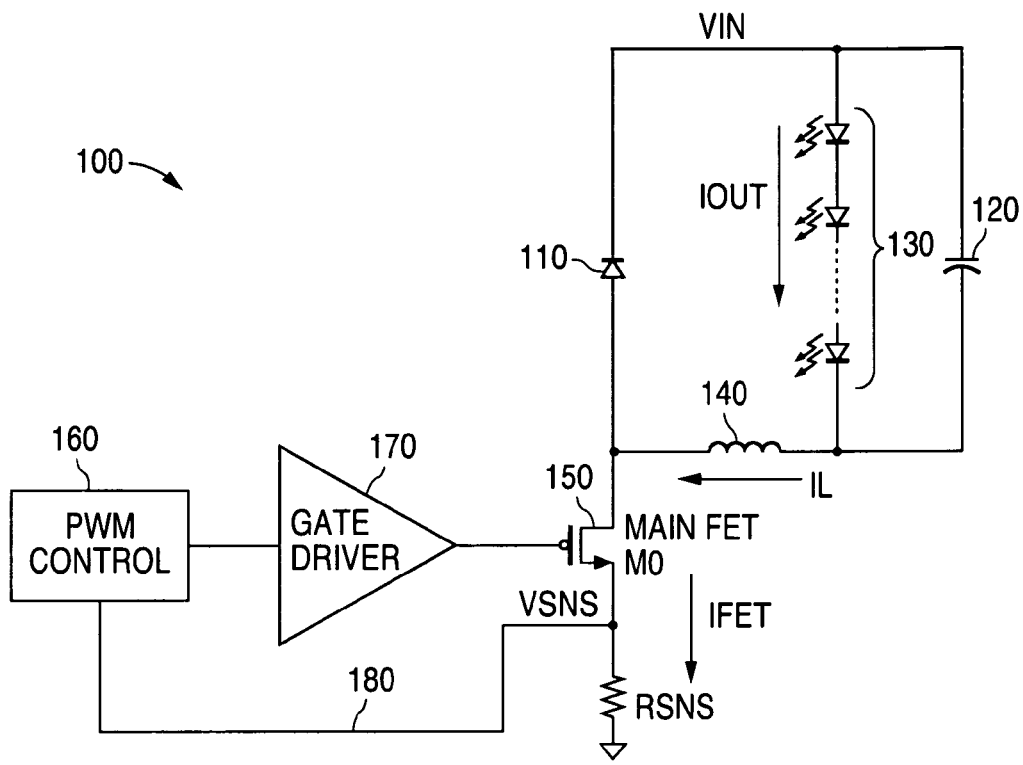
FIG. 1 illustrates a schematic circuit diagram of a prior art floating buck converter circuit.
Figure 3:
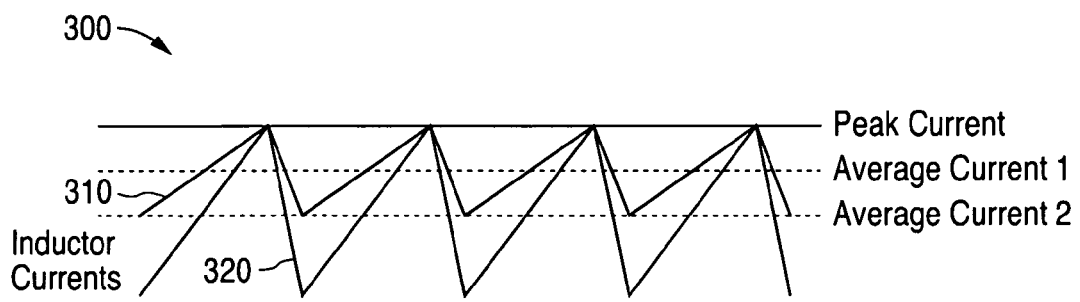
FIG. 3 illustrates two waveforms showing two inductor ripple currents through an inductor in a prior art floating buck converter circuit.
Figure 12:
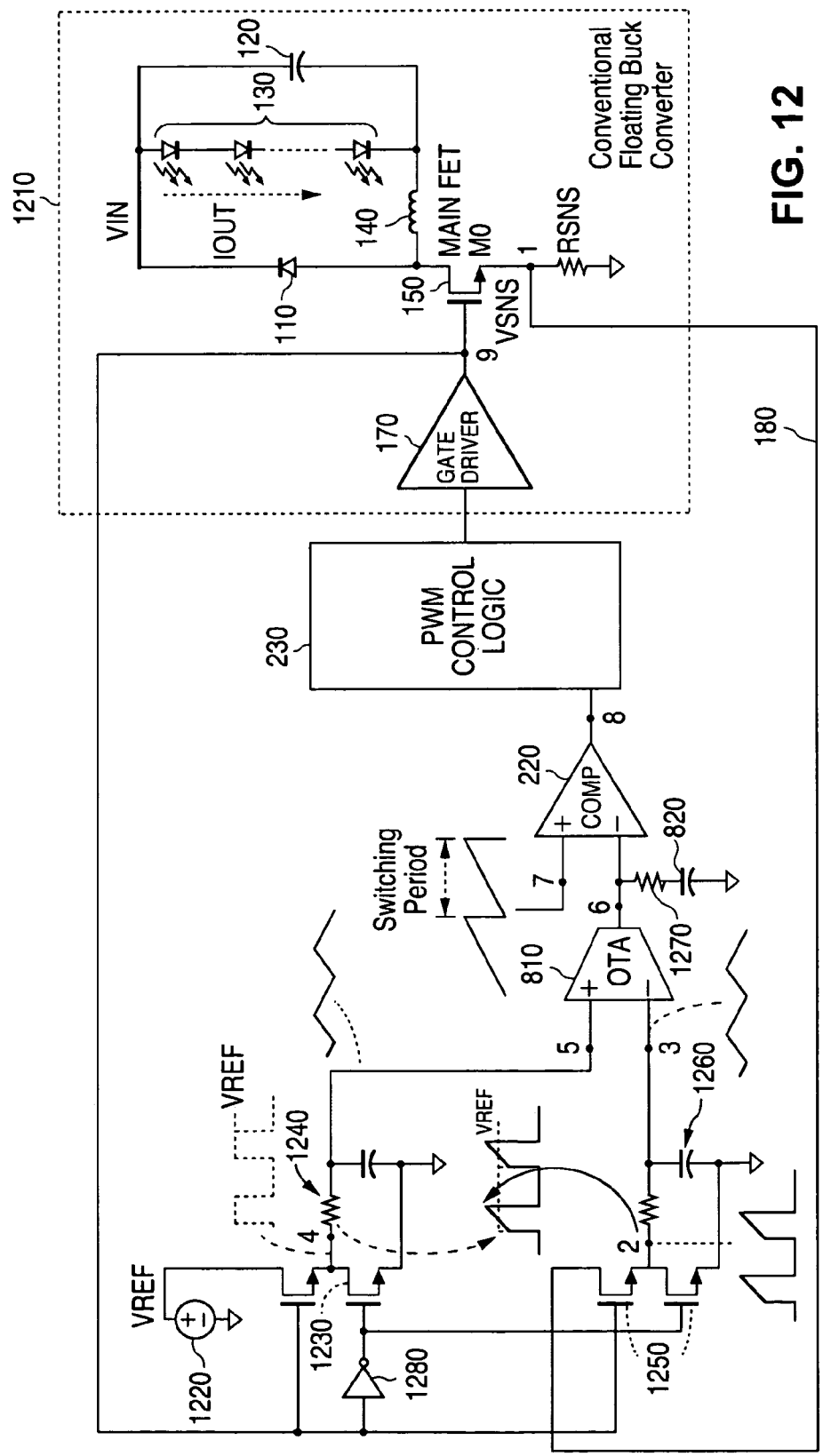
FIG. 12 illustrates a schematic diagram showing an advantageous embodiment of the apparatus of the present invention in more detail.

FIG. 12 illustrates a schematic diagram showing an advantageous embodiment of the apparatus of the present invention in more detail. The prior art floating buck converter circuit previously shown in FIG. 1 and in FIG. 2 is designated with reference numeral 1210. The pulse width modulation (PWM) control logic circuit 230 previously shown in FIG. 2 is also designated with reference numeral 230 in FIG. 12. The floating buck converter circuit 1210 accepts duty-cycle control signals from the PWM control logic circuit 230 to control output power to the load 130. The comparator 220 previously shown in FIG. 2 and in FIG. 8 is also designated with reference numeral 220 in FIG. 12.

The PWM control logic circuit 230 accepts control signals from the comparator 220 for controlling the duty cycle of the transistor 150 (MAIN FET M0) in floating buck converter circuit 1210. The PWM control logic circuit 230 will turn on transistor 150 periodically and will turn off transistor 150 when a logic "high" signal is detected at the output of comparator 220 (Node 8).

The operational transconductance amplifier (OTA) 810 previously shown in FIG. 8 is also designated with reference numeral 810 in FIG. 12. The filter capacitor 820 previously shown in FIG. 8 is also designated with reference numeral 820 in FIG. 12.

A voltage source 1220 outputs a precise direct current (DC) reference voltage (designated VREF). Voltage source 1220 provides the reference voltage VREF to apparatus 1230. As shown in FIG. 12, apparatus 1230 comprises a first transistor and a second transistor coupled in series. The drain of the first transistor of apparatus 1230 is coupled to the voltage source 1220. The source of the first transistor of apparatus 1230 is coupled to the drain of the second transistor of apparatus 1230. The source of the second transistor of apparatus 1230 is coupled to ground. A node that is designated as Node 4 is located between the source of the first transistor and the drain of the second transistor of apparatus 1230.

Apparatus 1230 transfers the direct current (DC) voltage VREF to Node 4 when transistor 150 is an "on" condition. Apparatus 1230 shorts Node 4 to ground when transistor 150 is an "off" condition. Node 4 is coupled to a low-pass filter 1240 that comprises a resistor and a capacitor. Low-pass filter 1240 receives the signal that is present at Node 4 and outputs the low-passed derivative of the signal at Node 4 to the non-inverting input of OTA 810 (that is designated Node 5).

A node that is designated Node 1 is located between the source of transistor 150 and the resistor RSNS in floating buck converter circuit 1210. Signal line 180 couples Node 1 to an apparatus 1250. As shown in FIG. 12, apparatus 1250 comprises a first transistor and a second transistor coupled in series. The drain of the first transistor of apparatus 1250 is coupled to Node 1 via signal line 180. The source of the first transistor of apparatus 1250 is coupled to the drain of the second transistor of apparatus 1250. The source of the second transistor of apparatus 1250 is coupled to ground. A node that is designated as Node 2 is located between the source of the first transistor and the drain of the second transistor of apparatus 1250.

Apparatus 1250 transfers the signal at Node 1 to Node 2 when transistor 150 is an "on" condition. Apparatus 1250 shorts Node 2 to ground when transistor 150 is an "off" condition. Node 2 is coupled to a low-pass filter 1260 that comprises a resistor and a capacitor. Low-pass filter 1260 receives the signal that is present at Node 2 and outputs the low-passed derivative of the signal at Node 2 to the inverting input of OTA 810 (that is designated Node 3).

OTA 810 has a high output impedance. OTA 810 accepts the voltage output of low-pass filter 1240 on its non-inverting input (Node 5) and accepts the voltage output of low-pass filter 1260 on its inverting input (Node 3). OTA 810 outputs their amplified differential signal at Node 6. A first end of resistor 1270 is coupled to Node 6. A second end of resistor 1270 is coupled to filter capacitor 820. Together resistor 1270 and filter capacitor 820 form an RC compensation network for OTA 810. The output of the RC compensation network is provided to the inverting input of comparator 220.

Comparator 220 compares the output of OTA 810 with the internally generated sawtooth voltage signal that is provided (at Node 7) to the non-inverting input of the comparator 220. The comparator 220 outputs a logic "high" signal (at Node 8) to the PWM control logic circuit 230 when the voltage at Node 7 is higher than the voltage at Node 6.

The output of the gate driver 170 is provided at Node 9. The output of the gate driver 170 is fed back to the apparatus 1230 and to the apparatus 1250. The output of the gate driver 170 is provided to the gate of the first transistor of apparatus 1230 and to the gate of the first transistor of apparatus 1250. The output of the gate driver 170 is also provided to an inverter circuit 1280 to generate an inverted form of the gate drive signal. The inverted form of the gate drive signal is provided to the gate of the second transistor of apparatus 1230 and to the gate of the second transistor of apparatus 1250.

The gate drive signal from Node 9 and the inverted form of the gate drive signal from Node 9 are used to modulate the precise direct current (DC) voltage reference 1220 (VREF) to form a well controlled square wave at Node 4. The well controlled square wave at Node 4 is synchronized with the transistor current sense signal VSNS at Node 1 with the top rail equal to the precise value of VREF.

As previously mentioned, the closed loop operation and the high gain of the OTA 810 work together to regulate the transistor current sense signal from Node 1 so that the Pulse Level Transformation of VSNS is equal to the well controlled square wave at Node 4. Through the Pulse Level Transformation process, the mid-level of the VSNS slope of the VSNS signals (and thus the direct current (DC) output current IOUT) are regulated with respect to the reference voltage VREF.

All system variables are confined within the negative feedback loop. In addition, apparatus 1230 and apparatus 1250 are matched to produce precise synchronization and matched parasitic effect. The accuracy of the system is guaranteed only through the precise and well controlled direct current (DC) reference voltage VREF (trimmed) and the high gain of the OTA 810. These features permit a robust embodiment of the present invention to be created.

Figure 13:
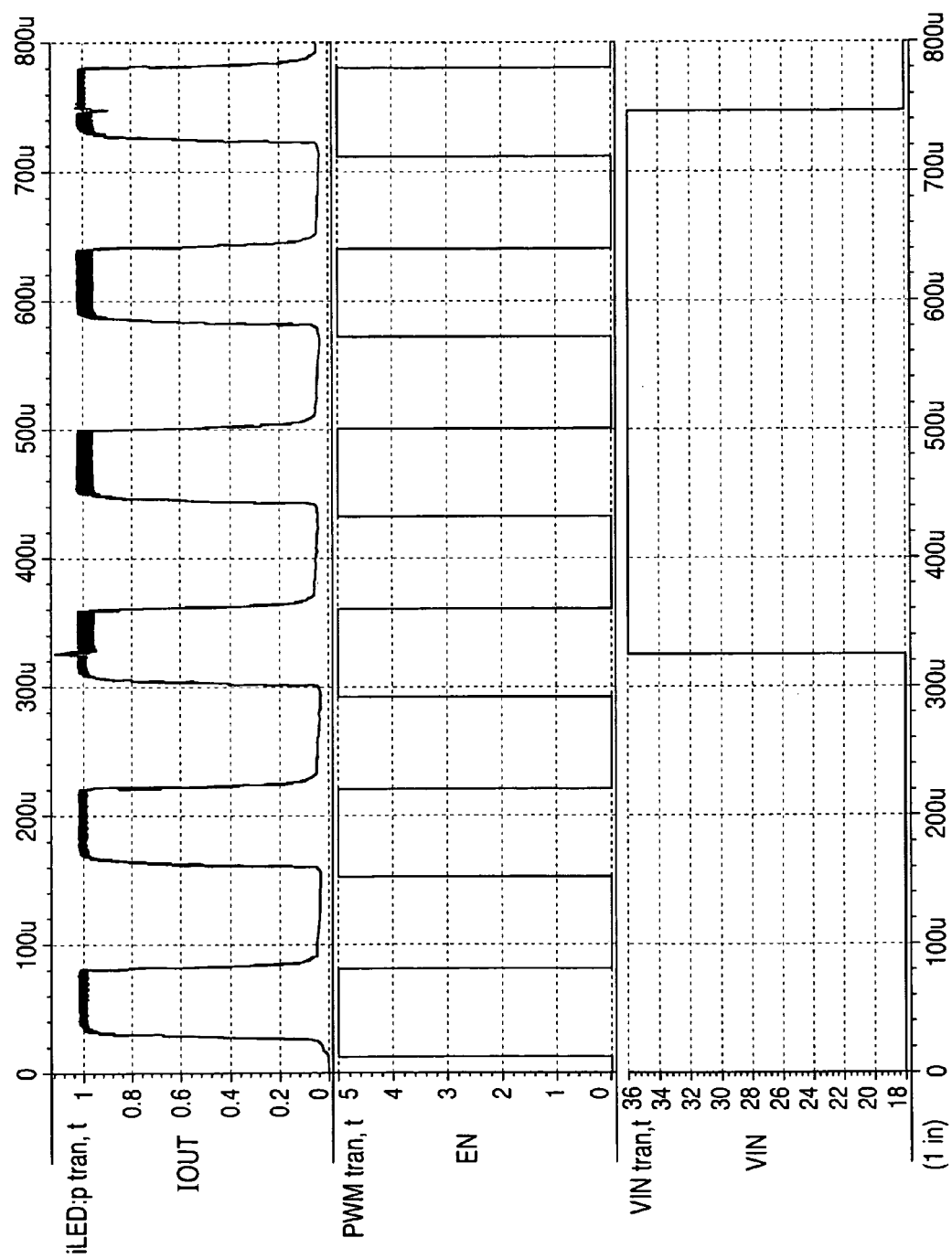
FIG. 13 illustrates exemplary voltage waveforms for the output current signal IOUT, the enable signal EN of the pulse width modulation (PWM) control logic circuit, and the input voltage signal VIN of a floating buck converter operated in accordance with the principles of the present invention.

FIG. 13 illustrates exemplary voltage waveforms for the output current signal IOUT, the enable signal EN of the pulse width modulation (PWM) control logic circuit, and the input voltage signal VIN of a floating buck converter operated in accordance with the principles of the present invention. The horizontal axis represents time in units of microseconds. The time extends from zero to eight hundred microseconds (800u). The top vertical axis for the IOUT signal represents current. The IOUT current varies from approximately zero ampere to approximately one ampere.

The middle vertical axis for the enable signal EN represents voltage. The EN voltage signal varies from approximately zero voltage units to approximately five voltage units. The bottom vertical axis for the input voltage signal VIN represents voltage. The VIN voltage signal varies from approximately eighteen (18) voltage units to approximately thirty six (36) voltage units.

As shown in FIG. 13, the IOUT current rises to and is regulated at a maximum (near one ampere) when the enable signal EN is high and drops to a minimum value (near zero) when the enable signal EN is low. The IOUT current experiences a very short upward "spike" when the VIN signal transits from a low level to a high level. The IOUT current also experiences a very short downward "spike" when the VIN signal transits from a high level to a low level.

Figure 14:
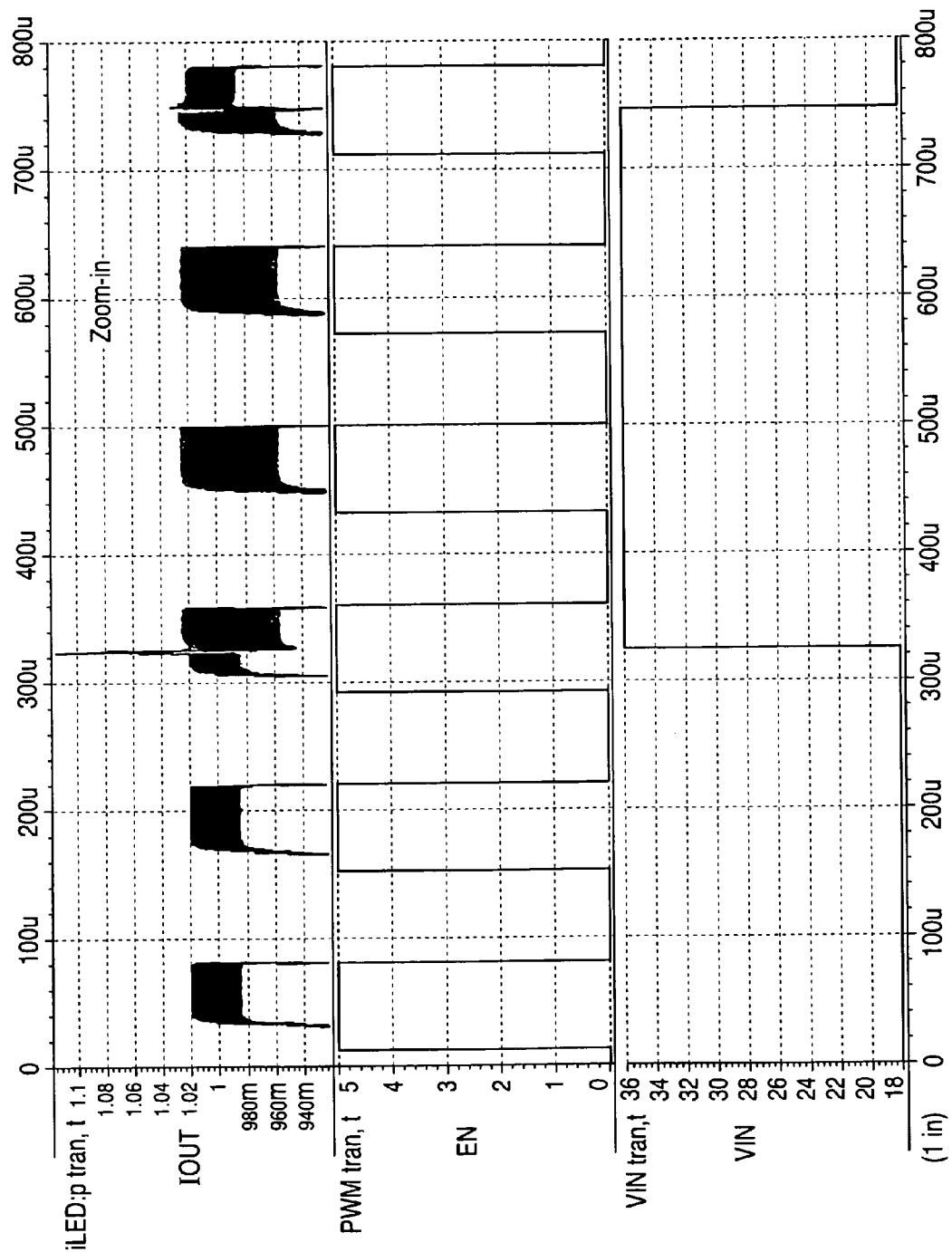
FIG. 14 illustrates the exemplary voltage waveforms shown in FIG. 13 showing the output current signal IOUT in higher resolution.

FIG. 14 illustrates the exemplary voltage waveforms shown in FIG. 13 showing the output current signal IOUT in higher resolution. The top vertical scale of the IOUT current extends from about nine hundred forty milliamperes (940 mA) to about one and one tenth amperes (1.1 A). The IOUT current scale in FIG. 14 is designated "Zoom-in" to indicate the increased resolution of the vertical scale. As shown in FIG. 14, the IOUT current experiences a very short upward "spike" to about one and twelve hundredths ampere (1.12 A) when the VIN signal transits from a low level to a high level. After the upward "spike" the vertical range of the IOUT current is greater than it was when the VIN signal was a low level. The vertical range of the IOUT current varies from a low level of about nine hundred sixty milliamperes (960 mA) to a high level of about one and two hundredths ampere (1.02 A). The vertical range of the IOUT current returns to its original vertical range after the VIN signal transits from a high level to a low level.

Figure 15:
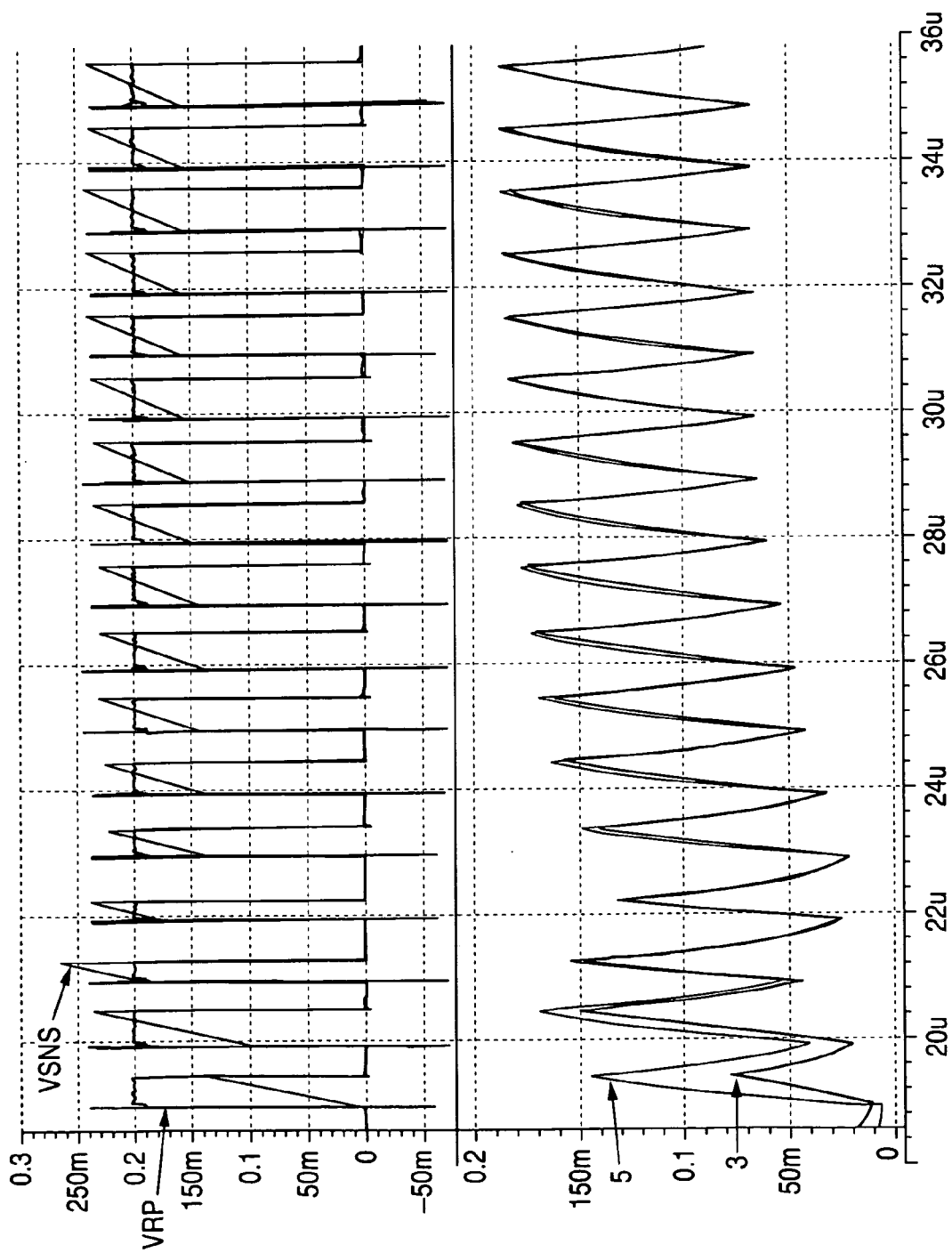
FIG. 15 illustrates exemplary voltage waveforms of certain nodes of the apparatus of the present invention during a startup procedure.

FIG. 15 illustrates exemplary voltage waveforms of certain nodes of the apparatus of the present invention during a startup procedure. The horizontal axis represents time in units of microseconds. The time extends from about nineteen microseconds (19u) to about thirty six microseconds (36u). The top vertical axis for the VSNS signal and the VRP signal represents voltage. The top vertical scale extends from a negative fifty millivolts (−50 mV) to a positive three hundred millivolts (300 mV) which equals three tenths of a volt (0.3 V). The signal with the VSNS label is the signal that is present at Node 2 at startup. The signal with the VRP label is the signal that is present at Node 4 at startup.

As shown in FIG. 15, at the startup the VSNS signal at Node 2 is initially lower in value than the VRP signal at Node 4. The operation of the apparatus of the present invention quickly brings the VSNS signal and the VRP signal into regulation in the manner previously described.

The lower vertical axis of FIG. 15 extends from zero volts to two hundred millivolts (200 mV) which equals two tenths of a volt (0.2 V). The signal with the label "5" is the signal that is present at Node 5 at startup. The signal with the label "31" is the signal that is present at Node 3 at startup. As shown in FIG. 15, at the startup the signal at Node 3 is initially lower in value than the signal at Node 5. The operation of the apparatus of the present invention quickly brings the Node 3 signal and the Node 5 signal into regulation in the manner previously described.

Figure 16:
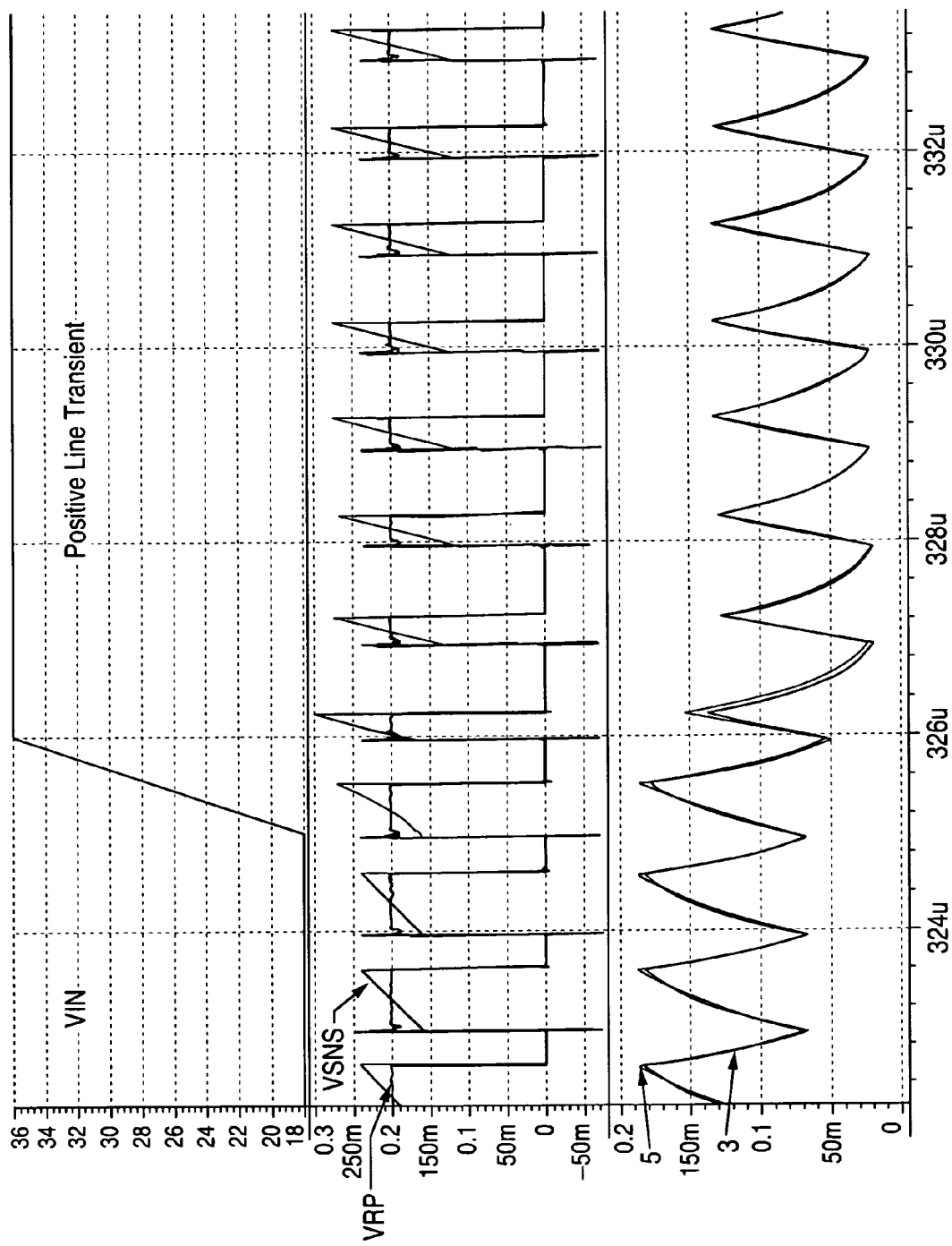
FIG. 16 illustrates exemplary voltage waveforms of certain nodes of the apparatus of the present invention during a positive line transient.

FIG. 16 illustrates exemplary voltage waveforms of certain nodes of the apparatus of the present invention during a positive line transient of the VIN signal. The horizontal axis represents time in units of microseconds. The time extends from about three hundred twenty two microseconds (322u) to about three hundred thirty three microseconds (333u). The top vertical axis for the VIN signal represents voltage. The top vertical axis for the VIN signal extends from about eighteen (18) voltage units to about thirty six (36) voltage units. The VIN signal transits from the low value of voltage to the high value of voltage in about one microsecond.

The middle vertical axis for the VSNS signal and the VRP signal represents voltage. The middle vertical scale extends from a negative fifty millivolts (−50 mV) to a positive three hundred millivolts (300 mV) which equals three tenths of a volt (0.3 V). The signal with the VSNS label is the signal that is present at Node 2. The signal with the VRP label is the signal that is present at Node 4.

As shown in FIG. 16, before the positive line transient of the VIN signal the VSNS signal at Node 2 and the VRP signal at Node 4 are in regulation. After the positive line transient of the VIN signal has occurred the operation of the apparatus of the present invention quickly brings the VSNS signal and the VIN signal back into regulation in the manner previously described.

The lower vertical axis of FIG. 16 extends from zero volts to two hundred millivolts (200 mV) which equals two tenths of a volt (0.2 V). The signal with the label "5" is the signal that is present at Node 5. The signal with the label "3" is the signal that is present at Node 3. As shown in FIG. 16, before the positive line transient of the VIN signal the signal at Node 3 and the signal at Node 5 are in regulation. After the positive line transient of the VIN signal has occurred the operation of the apparatus of the present invention quickly brings the Node 3 signal and the Node 5 signal back into regulation in the manner previously described.

Figure 17:
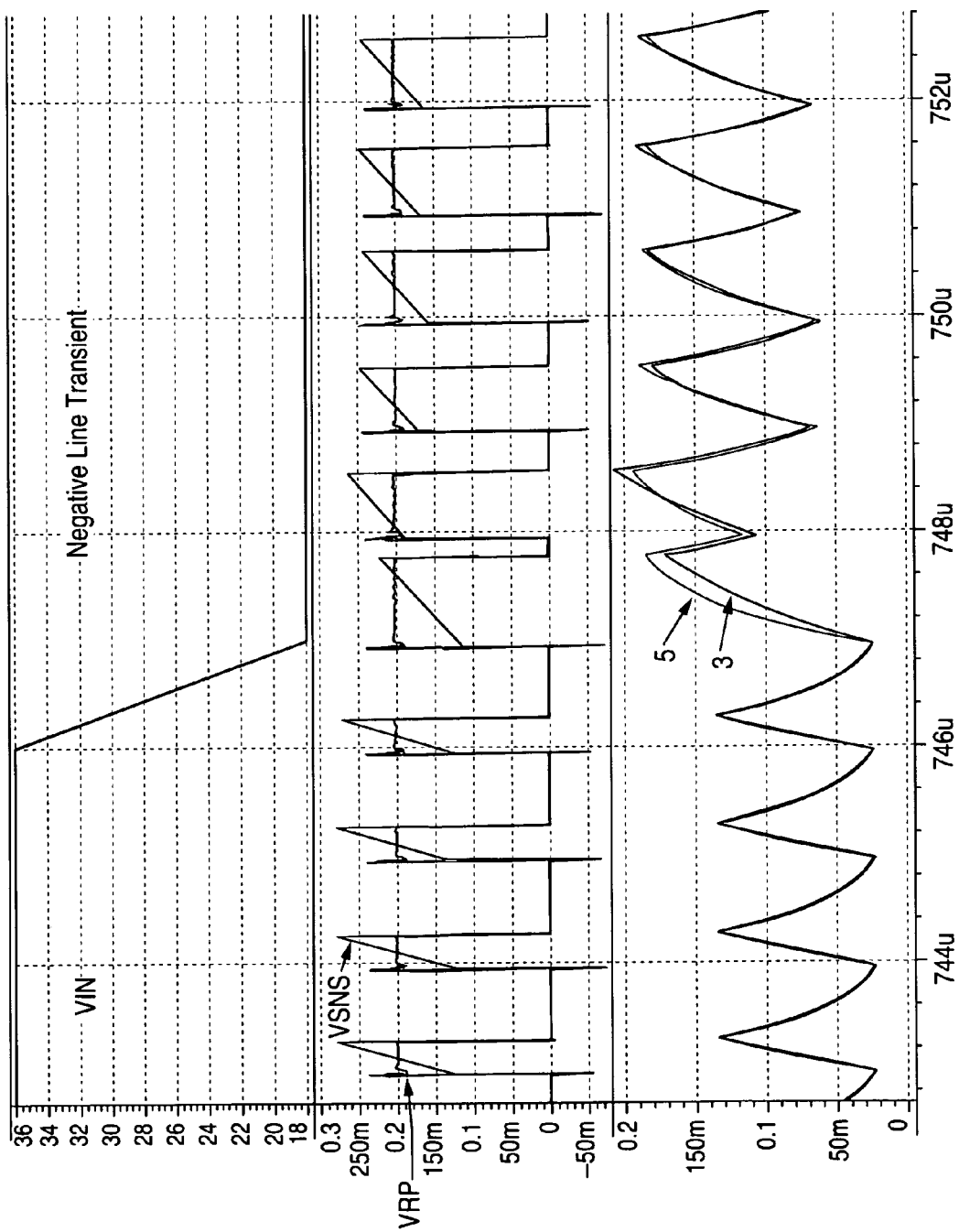
FIG. 17 illustrates exemplary voltage waveforms of certain nodes of the apparatus of the present invention during a negative line transient.

FIG. 17 illustrates exemplary voltage waveforms of certain nodes of the apparatus of the present invention during a negative line transient of the VIN signal. The horizontal axis represents time in units of microseconds. The time extends from about seven hundred forty three microseconds (743u) to about seven hundred fifty two microseconds (752u). The top vertical axis for the VIN signal represents voltage. The top vertical axis for the VIN signal extends from about eighteen (18) voltage units to about thirty six (36) voltage units. The VIN signal transits from the high value of voltage to the low value of voltage in about one microsecond.

The middle vertical axis for the VSNS signal and the VRP signal represents voltage. The middle vertical scale extends from a negative fifty millivolts (−50 mV) to a positive three hundred millivolts (300 mV) which equals three tenths of a volt (0.3 V). The signal with the VSNS label is the signal that is present at Node 2. The signal with the VRP label is the signal that is present at Node 4.

As shown in FIG. 17, before the negative line transient of the VIN signal the VSNS signal at Node 2 and the VRP signal at Node 4 are in regulation. After the negative line transient of the VIN signal has occurred the operation of the apparatus of the present invention quickly brings the VSNS signal and the VIN signal back into regulation in the manner previously described.

The lower vertical axis of FIG. 17 extends from zero volts to two hundred millivolts (200 mV) which equals two tenths of a volt (0.2 V). The signal with the label "5" is the signal that is present at Node 5. The signal with the label "3" is the signal that is present at Node 3. As shown in FIG. 17, before the negative line transient of the VIN signal the signal at Node 3 and the signal at Node 5 are in regulation. After the negative line transient of the VIN signal has occurred the operation of the apparatus of the present invention quickly brings the Node 3 signal and the Node 5 signal back into regulation in the manner previously described.

The foregoing description has set forth an improved and novel apparatus and method for precisely regulating the average output current of a floating buck converter circuit with high efficiency. The particular embodiment that has been described is particularly applicable to regulate high brightness light emitting diode (LED) systems. The present invention lends itself to a robust circuit implementation because the accuracy of the operation can be guaranteed solely by a well controlled precise direct current (DC) reference voltage.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment of a floating buck converter circuit, it is understood that various changes and modifications may be suggested to one skilled in the art. As previously mentioned, it is understood that the present invention is not limited to use in a floating buck converter circuit and that the principles of the present invention can also be employed in other types of devices. It is intended that the present invention encompass such changes and modifications as fall within the scope of the appended claims.

What is claimed is:

1. An apparatus for regulating a direct current output IOUT in an electronic device, said apparatus comprising:
  a circuit that receives as a first input a voltage signal VSNS from said electronic device that represents a current through said electronic device, and that receives as a second input a direct current reference voltage signal from a reference voltage source VREF, and that regulates said direct current output IOUT with respect to said reference voltage source VREF by applying a pulse level transformation to said voltage signal VSNS.

2. The apparatus as set forth in claim 1 wherein said circuit applies said pulse level transformation to said voltage signal VSNS by regulating a sloped increase in voltage of a pulse of said voltage signal VSNS.

3. The apparatus as set forth in claim 2 wherein said circuit applies said pulse level transformation by increasing a portion of said voltage signal VSNS below a mid-level value of voltage of said sloped increase in voltage up to said mid-level value of voltage and by decreasing a portion of said voltage signal VSNS above said mid-level value of voltage down to said mid-level value of voltage.

4. The apparatus as set forth in claim 3 wherein said mid-level value of voltage of said sloped increase in voltage of said voltage signal VSNS is equal in value to the product of said output current IOUT and a resistance RSNS of said electronic device.

5. The apparatus as set forth in claim 4 wherein said mid-level value of voltage of said sloped increase in voltage of said voltage signal VSNS is equal to an upper rail value of voltage of a waveform VRP that results from applying said pulse level transformation to said VSNS voltage signal.

6. The apparatus as set forth in claim 1 wherein said electronic device is a buck converter circuit.

7. The apparatus as set forth in claim 1 wherein said pulse level transformation of said voltage signal VSNS is independent of a value of inductance of an inductor of said electronic device, and independent of a value of inductor current ripple Irip in said electronic device, and independent of a value of a peak current Ipeak of said electronic device, and independent of a value of an input voltage VIN of said electronic device.

8. The apparatus as set forth in claim 1 wherein said circuit comprises an operational transconductance amplifier that applies said pulse level transformation to said voltage signal VSNS.

9. The apparatus as set forth in claim 8 wherein said circuit further comprises:
  a first control signal apparatus that transfers said direct current reference voltage signal from said reference voltage source VREF to a first input of said operational transconductance amplifier; and a second control signal apparatus that transfers said voltage signal VSNS from said electronic device to a second input of said operational transconductance amplifier.

10. The apparatus as set forth in claim 9 wherein said operational transconductance amplifier applies said pulse level transformation to said voltage signal VSNS by creating an amplified differential signal of said direct current reference voltage signal VREF and said voltage signal VSNS.

11. The apparatus as set forth in claim 10 further comprising a comparator circuit having one input coupled to an output of said operational transconductance amplifier.

12. The apparatus as set forth in claim 9 further comprising a feedback signal line from said electronic device coupled to said first control signal apparatus and to said second control signal apparatus, said feedback signal line providing a feedback signal that indicates an operational status of said electronic device.

13. A method for regulating a direct current output IOUT in an electronic device, said method comprising the steps of:
   receiving in a first input of a regulating circuit a voltage signal VSNS from said electronic device that represents a current through said electronic device;
   receiving in a second input of said regulating circuit a direct current reference voltage signal from a reference voltage source VREF; and
   regulating said direct current output IOUT with respect to said reference voltage source VREF by applying a pulse level transformation to said voltage signal VSNS.

14. The method as set forth in claim 13 wherein said step of regulating said direct current output IOUT with respect to said reference voltage source VREF by applying a pulse level transformation to said voltage signal VSNS comprises the steps of:
   regulating a sloped increase in voltage of a pulse of said voltage signal VSNS;
   increasing a portion of said voltage signal VSNS below a mid-level value of voltage of said sloped increase in voltage up to said mid-level value of voltage; and
   decreasing a portion of said voltage signal VSNS above said mid-level value of voltage down to said mid-level value of voltage.

15. The method as set forth in claim 14 wherein said mid-level value of voltage of said sloped increase in voltage of said voltage signal VSNS is equal in value to the product of said output current IOUT and a resistance RSNS of said electronic device.

16. The method as set forth in claim 13 wherein said wherein said pulse level transformation of said voltage signal VSNS is independent of a value of inductance of an inductor of said electronic circuit, and independent of a value of inductor current ripple Irip in said electronic circuit, and independent of a value of a peak current Ipeak of said electronic circuit, and independent of a value of an input voltage VIN of said electronic circuit.

17. The method as set forth in claim 13 wherein said step of regulating said direct current output IOUT with respect to said reference voltage source VREF by applying a pulse level transformation to said voltage signal VSNS comprises the steps of:
   receiving in a first input of an operational transconductance amplifier of said regulating circuit said direct current reference voltage signal from said reference voltage source VREF;
   receiving in a second input of said operational transconductance amplifier said voltage signal VSNS from said electronic device; and
   applying said pulse level transformation to said voltage signal VSNS in said operational transconductance amplifier by creating an amplified differential signal of said direct current reference voltage signal VREF and said voltage signal VSNS.

18. An apparatus for regulating a direct current output IOUT in a buck converter circuit, said apparatus comprising:
   a circuit that receives as a first input a voltage signal VSNS from said buck converter circuit that represents a current through said buck converter circuit, and that receives as a second input a direct current reference voltage signal from a reference voltage source VREF, and that regulates said direct current output IOUT with respect to said reference voltage source VREF by applying a pulse level transformation to said voltage signal VSNS.

19. The apparatus as set forth in claim 18 wherein said pulse level transformation of said voltage signal VSNS is independent of a value of inductance of an inductor of said buck converter circuit, and independent of a value of inductor current ripple Irip in said buck converter circuit, and independent of a value of a peak current Ipeak of said buck converter circuit, and independent of a value of an input voltage VIN of said buck converter circuit.

20. The apparatus as set forth in claim 18 wherein said circuit further comprises an operational transconductance amplifier that applies said pulse level transformation to said voltage signal VSNS by creating an amplified differential signal of said direct current reference voltage signal VREF and said voltage signal VSNS.

* * * * *

UNITED STATES PATENT AND TRADEMARK OFFICE
CERTIFICATE OF CORRECTION

| | |
|---|---|
| PATENT NO. | : 7,388,359 B1 |
| APPLICATION NO. | : 11/357353 |
| DATED | : June 17, 2008 |
| INVENTOR(S) | : Lawrence Hok-Sun Ling |

Page 1 of 1

It is certified that error appears in the above-identified patent and that said Letters Patent is hereby corrected as shown below:

Column 1, line 40, delete "voltage-signal" and insert -- voltage signal --

Column 10, line 35, delete "31" and insert -- 3 --

Signed and Sealed this

First Day of December, 2009

David J. Kappos
*Director of the United States Patent and Trademark Office*